(12) United States Patent
Kawakami et al.

(10) Patent No.: US 11,625,858 B2
(45) Date of Patent: Apr. 11, 2023

(54) VIDEO SYNTHESIS DEVICE, VIDEO SYNTHESIS METHOD AND RECORDING MEDIUM

(71) Applicant: DWANGO Co., Ltd., Tokyo (JP)

(72) Inventors: Nobuo Kawakami, Tokyo (JP); Shinnosuke Iwaki, Tokyo (JP); Takashi Kojima, Tokyo (JP); Toshihiro Shimizu, Tokyo (JP); Hiroaki Saito, Tokyo (JP)

(73) Assignee: Dwango Co., Ltd., Tokyo (JP)

( * ) Notice: Subject to any disclaimer, the term of this patent is extended or adjusted under 35 U.S.C. 154(b) by 0 days.

(21) Appl. No.: 17/531,540

(22) Filed: Nov. 19, 2021

(65) Prior Publication Data

US 2022/0084243 A1 Mar. 17, 2022

Related U.S. Application Data

(63) Continuation of application No. 17/263,760, filed as application No. PCT/JP2018/047435 on Dec. 25, 2018, now Pat. No. 11,195,302.

(30) Foreign Application Priority Data

Nov. 30, 2018 (JP) ............................. JP2018-225022

(51) Int. Cl.
*G06T 7/70* (2017.01)
*G06T 7/73* (2017.01)
(Continued)

(52) U.S. Cl.
CPC .............. *G06T 7/75* (2017.01); *G06T 19/006* (2013.01); *G06V 40/161* (2022.01); *G06V 40/176* (2022.01)

(58) Field of Classification Search
CPC ........... G06T 7/75; G06T 5/50; G06T 19/006; G06T 2207/20221; G06V 40/161; G06V 40/176
See application file for complete search history.

(56) References Cited

U.S. PATENT DOCUMENTS 9,024,972 B1 * 5/2015 Bronder .................... G06T 3/60
345/633
11,195,302 B2 * 12/2021 Kawakami ............ G06F 3/0484
(Continued)

FOREIGN PATENT DOCUMENTS

AU   2015253557 A1   3/2017
CA      2899998 A1   8/2014
(Continued)

OTHER PUBLICATIONS

English translation of Decision to Grant a Patent for JP Application No. 2018-225022, dated Jul. 2, 2019.
(Continued)

*Primary Examiner* — Sean T Motsinger
(74) *Attorney, Agent, or Firm* — Dorsey & Whitney LLP

(57) ABSTRACT

A rear-facing camera captures a live-action video image while a front-facing camera captures an image of a distributor. An avatar controller controls an avatar based on the image of the distributor captured by the front-facing camera. A synthesizer arranges the avatar in a predetermined position of a real space coordinate system and synthesizes the avatar with the live-action video image. The face of the distributor captured by the front-facing camera is tracked and reflected on the avatar.

20 Claims, 8 Drawing Sheets

FIG.2

(51) Int. Cl.
  *G06T 19/00* (2011.01)
  *G06V 40/16* (2022.01)

(56) References Cited

U.S. PATENT DOCUMENTS

| | | | | |
|---|---|---|---|---|
| 11,367,260 | B2* | 6/2022 | Kawakami | G06T 7/73 |
| 2004/0085334 | A1* | 5/2004 | Reaney | G06T 19/006 |
| | | | | 704/E21.02 |
| 2009/0158220 | A1* | 6/2009 | Zalewski | A63F 13/812 |
| | | | | 382/103 |
| 2009/0195650 | A1* | 8/2009 | Hanai | G06T 11/60 |
| | | | | 382/284 |
| 2010/0281432 | A1* | 11/2010 | Geisner | G06F 3/011 |
| | | | | 715/849 |
| 2011/0149169 | A1* | 6/2011 | Oami | H04N 21/4622 |
| | | | | 348/E5.093 |
| 2011/0285703 | A1* | 11/2011 | Jin | G06Q 50/01 |
| | | | | 345/419 |
| 2012/0131478 | A1* | 5/2012 | Maor | G06T 19/20 |
| | | | | 715/757 |
| 2013/0249947 | A1* | 9/2013 | Reitan | G06T 19/006 |
| | | | | 345/633 |
| 2014/0218361 | A1 | 8/2014 | Abe et al. | |
| 2015/0310263 | A1 | 10/2015 | Zhang et al. | |
| 2015/0365593 | A1 | 12/2015 | Shinozaki et al. | |
| 2017/0004657 | A1 | 1/2017 | Zagel et al. | |
| 2018/0174347 | A1* | 6/2018 | Chaney | G09G 5/377 |
| 2018/0302499 | A1 | 10/2018 | Kada | |
| 2018/0336713 | A1 | 11/2018 | Avendano et al. | |
| 2018/0350144 | A1* | 12/2018 | Rathod | H04W 4/021 |
| 2019/0272661 | A1* | 9/2019 | Reeves | H04W 12/08 |
| 2019/0355178 | A1* | 11/2019 | Hermina Martinez | |
| | | | | G06V 20/597 |
| 2019/0355179 | A1* | 11/2019 | Bortolini | H04N 7/147 |
| 2019/0370593 | A1* | 12/2019 | Nakao | H04N 5/232 |
| 2020/0118343 | A1* | 4/2020 | Koblin | H04N 5/23229 |
| 2021/0064910 | A1* | 3/2021 | Meier | G06V 40/171 |
| 2021/0174544 | A1* | 6/2021 | Kawakami | H04N 5/262 |
| 2021/0233325 | A1* | 7/2021 | Kawakami | H04N 5/225 |
| 2022/0044450 | A1* | 2/2022 | Nakade | G01C 21/3632 |

FOREIGN PATENT DOCUMENTS

| | | |
|---|---|---|
| CA | 2943424 A1 | 11/2015 |
| CN | 101958976 A | 1/2011 |
| CN | 103970268 A | 8/2014 |
| CN | 104995905 A | 10/2015 |
| CN | 106255978 A | 12/2016 |
| EP | 2959673 A1 | 12/2015 |
| EP | 3137938 A1 | 3/2017 |
| JP | 2014039186 A | 2/2014 |
| JP | 2014149712 A | 8/2014 |
| JP | 2014160982 A | 9/2014 |
| JP | 2015116336 A | 6/2015 |
| JP | 2017516140 A | 6/2017 |
| JP | 2017188787 A | 10/2017 |
| JP | 6367450 B1 | 7/2018 |
| JP | 2018187298 A | 11/2018 |
| KR | 20160146861 A | 12/2016 |
| MX | 2016014091 A | 2/2017 |
| RU | 2016141911 A | 4/2018 |
| WO | 2014129141 A1 | 8/2014 |
| WO | 2015167909 A1 | 11/2015 |
| WO | 2018142756 A1 | 8/2018 |

OTHER PUBLICATIONS

International Search Report and Written Opinion for Application No. PCT/JP2018/047435 dated Feb. 5, 2019 (engl. translation of ISR only).
English translation of Notice of Reasons for Refusal for JP Application No. 2018-225022, dated Apr. 17, 2019.
English translation of Notice of Reasons for Refusal for JP Application No. 2018-225022, dated Jan. 29, 2019.
English translation of written opinion received in PCT App. No. PCT/JP2018/047435 dated Feb. 5, 2019.
PoKeMoN GO, the electric shock Nintendo, Kadokawa Corporation, vol. 16, No. 6, Apr. 21, 2016, p. 58.
[English Translation] Notice of Reasons for Refusal for Japanese Patent Application No. 2019-131762 dated Oct. 17, 2022, pp. all.

* cited by examiner

VIDEO SYNTHESIS DEVICE, VIDEO SYNTHESIS METHOD AND RECORDING MEDIUM

CROSS-REFERENCE TO RELATED APPLICATION(S)

This application is a continuation of U.S. patent application Ser. No. 17/263,760, filed on Jan. 27, 2021, which is a 371 National Stage application of International Application No. PCT/JP2018/047435, filed Dec. 25, 2018, which claims priority to Japanese Patent Application No. 2018-225022 filed on Nov. 30, 2018. The aforementioned applications are incorporated herein by reference, in their entirety, for any purposes.

TECHNICAL FIELD

The present disclosure relates to a technology of generating an augmented reality video image.

BACKGROUND ART

There has been an increasing number of video distribution services that allow individuals to distribute video images via networks, in recent years. Among such video distribution services, there is known an application program that allows distribution of a video image with a computer graphics character (CG character) in place of a user. There is also a known technology of tracking a face in a selfie captured by a smartphone, and reflecting the facial expression of the user to a CG character.

CITATION LIST

Patent Documents

Patent Document 1 Japanese Unexamined Patent Publication No. 2017-188787

SUMMARY OF THE INVENTION

By synthesizing the CG character to a selfie video image by using a face-tracking technology, the CG character reflecting the facial expression of the user him/herself can be easily synthesized real time with a live-action video image.

However, the captured live-action video image is only the landscape behind the user. To synthesize a CG character that reflects the user's facial expression with an image of a landscape before the user's eyes as the background, the user needs to capture an image of him/herself with the intended landscape at the back of the user by using a selfie stick.

In view of the above circumstance, it is an object of this embodiment to more easily generate a video image in which an expressive computer graphics character is synthesized.

A video synthesis device related to a first aspect of the present embodiment is a video synthesis device configured to generate an augmented reality video image in which an avatar is synthesized with a live-action video image, including: a first imaging unit configured to capture a live-action video image; a second imaging unit configured to capture an image of an operator; a position detector configured to detect a position and an orientation of the first imaging unit or the video synthesis device in a coordinate system corresponding to a real space; a controller configured to control the avatar based on an image captured by the second imaging unit; and a synthesizer configured to arrange the avatar in a predetermined position of the coordinate system and synthesize the avatar with the live-action video image captured by the first imaging unit.

A video synthesis method related to a second aspect of the present embodiment is a video synthesis method for generating an augmented reality video image in which an avatar is synthesized with a live-action video image, including computer-executed steps of: detecting a position and an orientation of a first imaging unit configured to capture the live-action video image, in a coordinate system corresponding to a real space; controlling the avatar based on an image captured by a second imaging unit configured to capture an image of an operator; and arranging the avatar in a predetermined position of the coordinate system and synthesize the avatar with the live-action video image captured by the first imaging unit.

A recording medium related to a third aspect of the present embodiment is a computer-readable recording medium, storing a program to cause a processor to execute the processes of: detecting a position and an orientation of a first imaging unit configured to capture the live-action video image, in a coordinate system corresponding to a real space; controlling the avatar based on an image captured by a second imaging unit configured to capture an image of an operator; and arranging the avatar in a predetermined position of the coordinate system and synthesizing the avatar with the live-action video image captured by the first imaging unit.

This embodiment allows easier generation of a video image in which an expressive computer graphics character is synthesized.

DESCRIPTION OF EMBODIMENTS

The following describes embodiments with reference to attached drawings.

Figure 1:
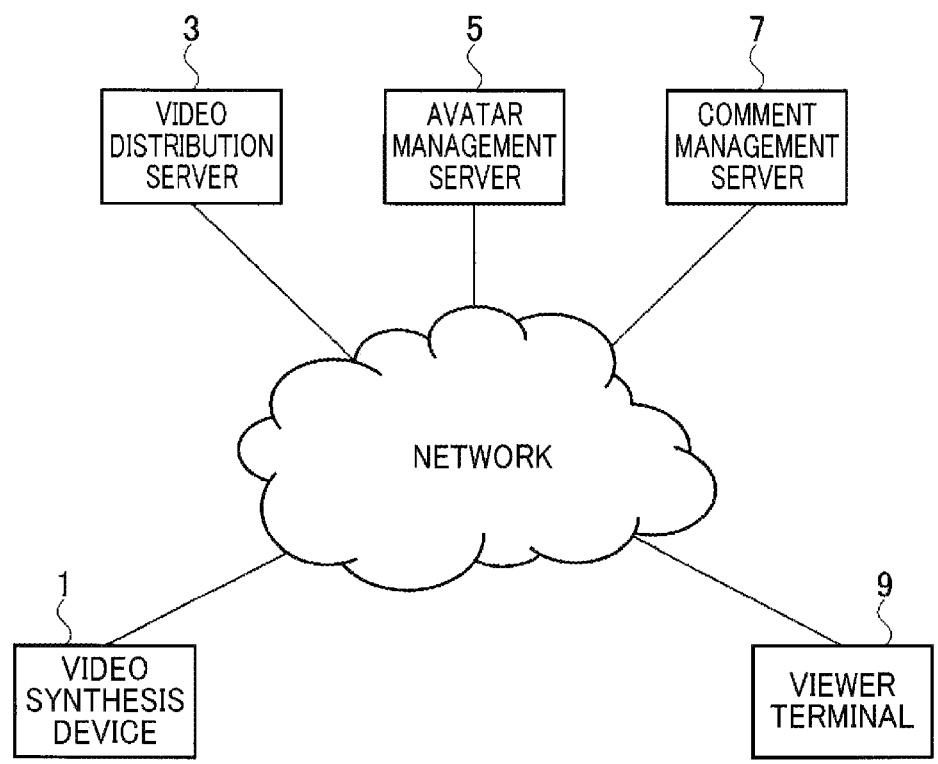
FIG. 1 is a diagram showing an overall configuration of a video distribution system including a video synthesis device of an embodiment.

With reference to FIG. 1, the following describes an overall configuration of a video distribution system including a video synthesis device of the present embodiment. The video distribution system includes a video synthesis device 1 and a video distribution server 3.

The video synthesis device 1 synthesizes a 3-dimensional computer graphics character (avatar) with a live-action video captured by the video synthesis device 1 and generates an augmented reality video image (hereinafter, AR video image).

The video distribution server 3 receives the AR video image from the video synthesis device 1 and distributes the AR video image to viewer terminals 9. The video distribution server 3 may distribute in real time the AR video image received (so-called live broadcasting), or store the AR video image and distribute to the AR video image upon request from any of the viewer terminals 9.

The video distribution system may include an avatar management server 5 and a comment management server 7.

The avatar management server 5 manages 3-dimensional data of avatars. The video synthesis device 1 may allow generation of a customized avatar by combining parts of the avatar provided from the avatar management server 5.

The comment management server 7 receives a comment on the AR video image from the viewer terminal 9 and distributes the comment to the video synthesis device 1 and other viewer terminals 9.

The video synthesis device 1, the video distribution server 3, the avatar management server 5, the comment management server 7, and the viewer terminals 9 are connected to be capable of communicating with one another via a network.

Figure 2:
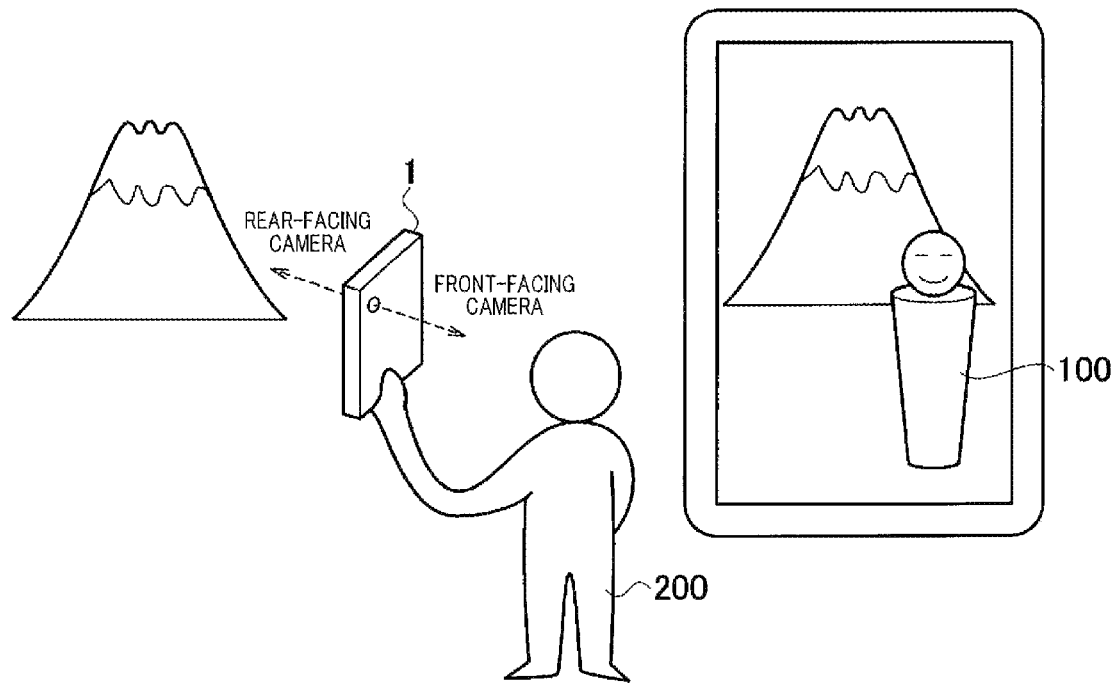
FIG. 2 is an explanatory diagram showing how a distributor distributes an AR video image.
Figure 3:
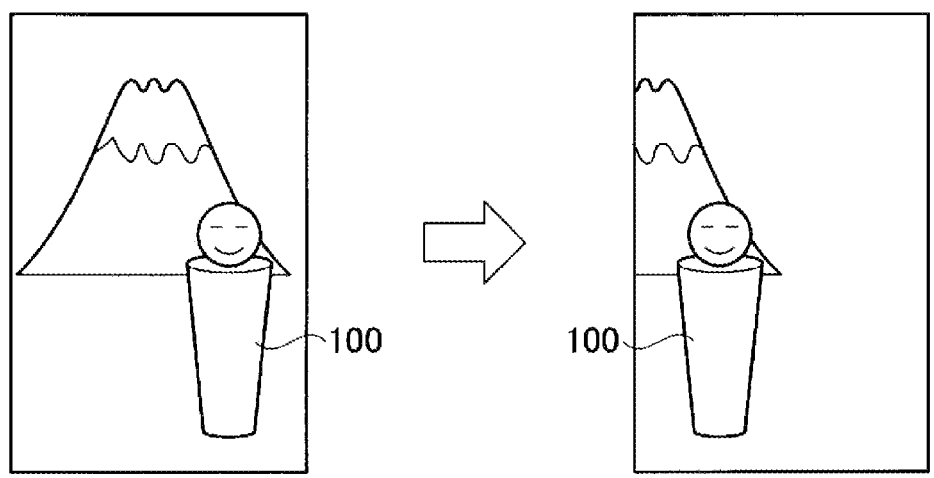
FIG. 3 is a diagram showing an example of an AR video image when the capturing direction is panned to the right.

The following describes the AR video image generated by the video synthesis device 1, with reference to FIG. 2 and FIG. 3.

The video synthesis device 1 includes a rear-facing camera and a front-facing camera whose respective capturing directions are opposite to each other, a microphone, a touch panel, and various sensors to detect the current position (e.g., an acceleration sensor, a gyro sensor, or the like). A video synthesis device 1 may be a smartphone or a tablet PC having a rear-facing camera and a front-facing camera.

As illustrated in FIG. 2, a distributor 200 holds the video synthesis device 1 and capture, with the rear-facing camera, an image of the landscape the distributor 200 sees while capturing an image of the distributor 200 with the front-facing camera. The video synthesis device 1 generates an AR video image by synthesizing an avatar 100 with the live-action video captured by the rear-facing camera. The video synthesis device 1 reflects the facial expression of the distributor 200 captured by the front-facing camera on the facial expression of the avatar 100. For example, while the distributor 200 is talking, the video synthesis device 1 tracks the face of the distributor 200 captured by the front-facing camera, and moves the mouth of the avatar 100 in response to the mouth movement of the distributor 200. The video synthesis device 1 may reflect the movement of the head of the distributor 200 on the avatar 100, or the gesture of the distributor 200 on the avatar 100. With this, the distributor 200 is able to control the avatar 100 while capturing the landscape before his/her eyes.

The video synthesis device 1 fixes the avatar 100 to a coordinate system that corresponds to the real space and synthesizes the avatar 100 with the video image. As illustrated in FIG. 3, when the capturing direction of the rear-facing camera is panned rightward, the avatar 100 shifts leftward in the video image along with the other objects in the real space.

[Configuration of Video Synthesis Device]

Figure 4:
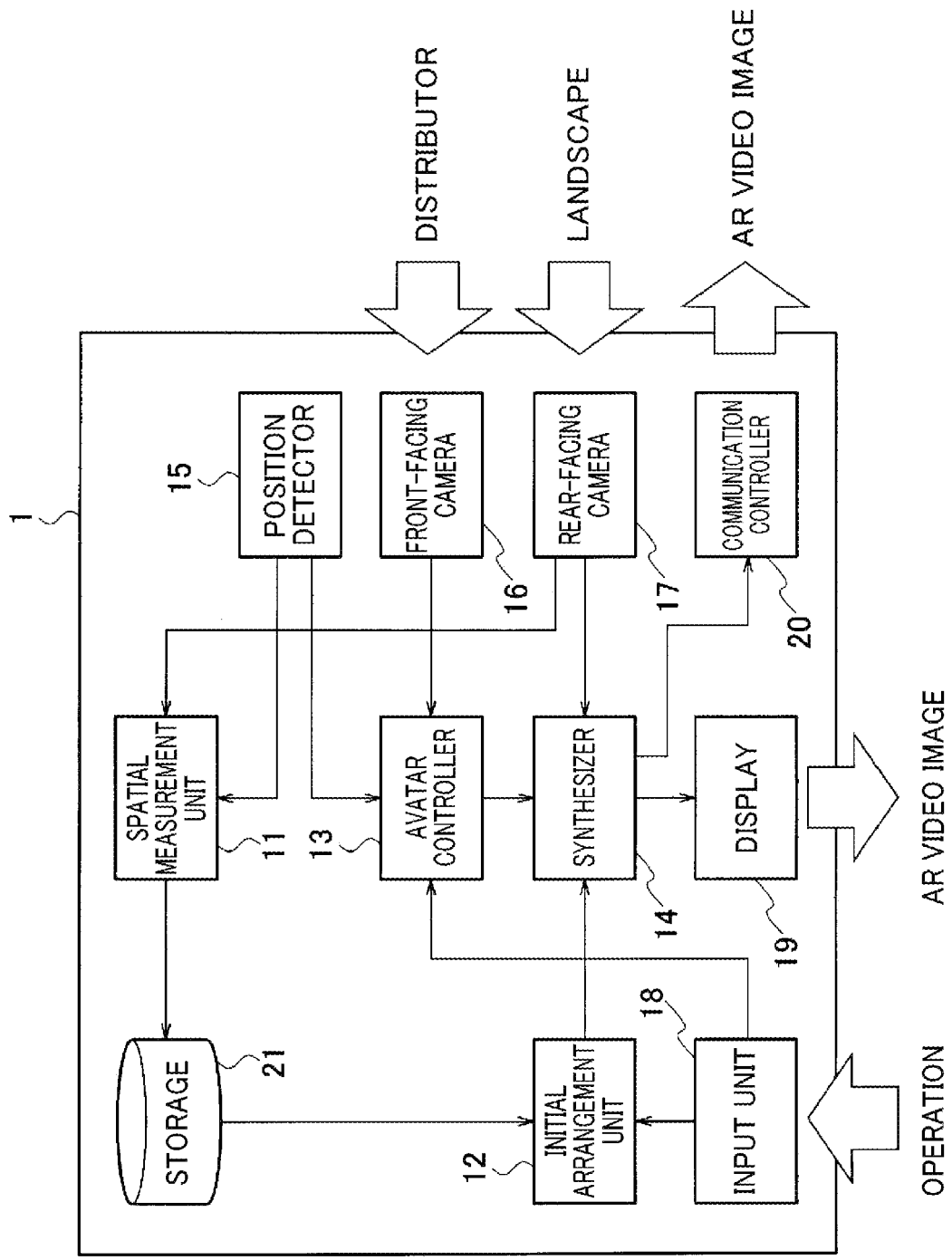
FIG. 4 is a functional block diagram showing an exemplary configuration of the video synthesis device of this embodiment.

The following describes an exemplary configuration of the video synthesis device 1, with reference to FIG. 4. As shown in the figure, the video synthesis device 1 has a spatial measurement unit 11, an initial arrangement unit 12, an avatar controller 13, a synthesizer 14, a position detector 15, a front-facing camera 16, a rear-facing camera 17, an input unit 18, a display 19, a communication controller 20, and a storage 21. Each part of the video synthesis device 1 may be configured by a computer including an arithmetic processing device, a storage device and the like, and processes of each part may be executed by a program. Such a program may be stored in the storage device of the video synthesis device 1, or stored in a recording medium such as a magnetic disc, an optical disc, a semiconductor memory, and the like, or provided through a network. For example, an application program may be installed in a smartphone to function the smartphone as the video synthesis device 1.

The spatial measurement unit 11 performs measurement to obtain 3-dimensional spatial information of a real space for arranging therein the avatar, set a real space coordinate system corresponding to the real space, and detects an area in which the avatar can be arranged (hereinafter, avatar-arrangeable area). For example, a video image of the real space is captured by the rear-facing camera 17, and the 3-dimensional spatial information of the real space at the capturing site can be obtained through a measurement using a marker-less AR technology with a monocular camera. The spatial measurement unit 11 detects, as the avatar-arrangeable area, a flat portion such as a floor and the like in the 3-dimensional spatial information obtained by the measurement. The position to be detected as the avatar-arrangeable area by the spatial measurement unit 11 is not particularly limited as long as arranging of the avatar does not look unnatural, and may be an area sloped with respect to the ground or an area with an irregular shape.

If the video synthesis device 1 has a depth camera or a stereo camera, the spatial measurement unit 11 may obtain 3-dimensional spatial information from a measurement result of the depth camera or from a stereo image. The spatial measurement unit 11 stores, in the storage 21, the 3-dimensional spatial information obtained through the measurement.

The initial arrangement unit 12 determines an initial position of the avatar so that the avatar is in the avatar-arrangeable area detected by the spatial measurement unit 11. For example, an image in which a symbol (e.g., a frame indicating the range of the floor, and the like) indicating the avatar-arrangeable area is superimposed on the video image of the real space captured by the rear-facing camera 17, prompting the distributor to designate the initial position of the avatar. When the distributor taps a position within the avatar-arrangeable area, the initial arrangement unit 12 calculates the coordinates of the tapped position in the real space coordinate system, and determines the position as the avatar initial position. The initial arrangement unit 12 may arrange the avatar in any position within the avatar-arrangeable area. When the distributor swings the video synthesis device 1, the position of the avatar may be randomly changed.

The avatar controller 13 tracks the face of the distributor captured by the front-facing camera 16, and reflects the facial expression of the distributor on the facial expression of the avatar. The avatar controller 13 may control the avatar according to an operation input by the distributor through a menu and the like. The avatar controller 13 may control the posture and the position of the avatar based on the movement of the video synthesis device 1. For example, when the distributor is moving forward while capturing the landscape, the avatar may be controlled to walk forward.

The synthesizer 14 arranges the avatar in the real space coordinate system, and synthesizes the avatar with the video image captured by the rear-facing camera 17 to generate an AR video image. The AR video image is displayed on the display 19, and transmitted to the video distribution server 3 through the communication controller 20. The synthesizer 14 may store the AR video image in the storage 21. It should be noted that data required for rendering the avatar is received from the avatar management server 5 and stored in the storage 21. Avatar data stored in the storage 21 in advance may be used.

The position detector 15 detects the position and the orientation of the video synthesis device 1 in the real space coordinate system (also the position and the orientation of the rear-facing camera 17). The synthesizer 14 renders the avatar based on the position and the orientation detected by the position detector 15.

The front-facing camera 16 captures an image of the distributor (who is also an operator of the video synthesis device 1).

The rear-facing camera 17 captures an image of the landscape and an object of capturing to be delivered in the form of AR video image.

The input unit 18 receives an operation through the touch panel of the video synthesis device 1.

The display 19 displays on the touch panel an AR video image in which the avatar is synthesized with the live-action video captured by the rear-facing camera 17. Various buttons to operate the avatar may be displayed.

The communication controller 20 transmits the AR video image to the video distribution server 3.

[Initial Arrangement of Avatar]

Figure 5:
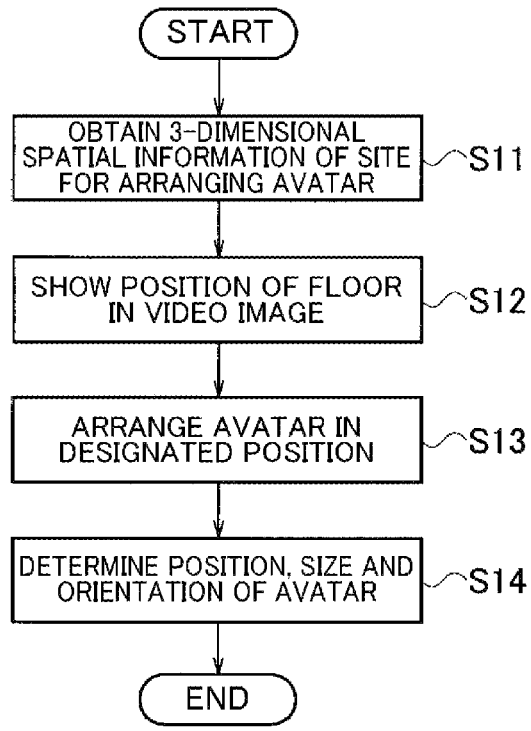
FIG. 5 is a flowchart showing a flow of an avatar initial arrangement process.

The following describes an exemplary avatar initial arrangement process, with reference to FIG. 5.

The process shown in FIG. 5 is executed at a time of determining the position of the avatar in the real space coordinate system, before the distributor generates the AR video image.

The distributor starts the video synthesis device 1, and uses the rear-facing camera 17 to capture the video image of a site for arranging the avatar, and obtains the 3-dimensional spatial information of the site for arranging the avatar (step S11). Specifically, an application program is started to operate a smartphone as the video synthesis device 1, and an image of a flat place for arranging the avatar is captured by the rear-facing camera 17. The distributor captures the image of the arrangement place while slightly moving the video synthesis device 1. The 3-dimensional spatial information is obtained from the movement of a characteristic point detected based on the movement of the video synthesis device 1 and the captured video image, and the avatar-arrangeable area which allows arrangement of the avatar therein is detected. In this case, a flat "floor" is detected as the avatar-arrangeable area.

Figure 6:
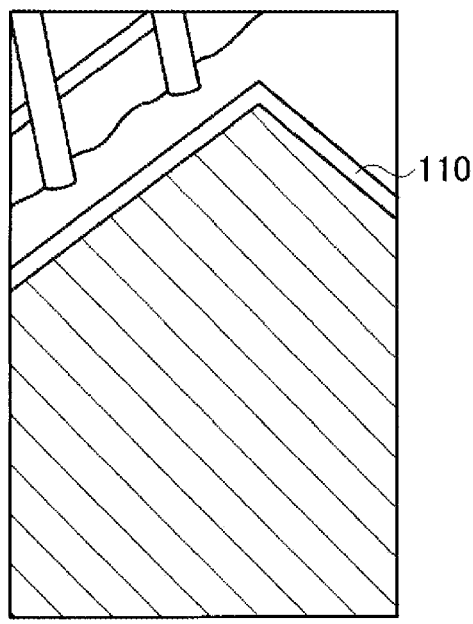
FIG. 6 is a diagram showing an example in which a floor portion is superimposed and displayed on a captured video image.

When the spatial measurement unit 11 obtains the 3-dimensional spatial information and detects the floor, the display 19 superimposes and displays a shape indicating a floor area on the video image captured by the rear-facing camera 17 (step S12). For example, as illustrated in FIG. 6, a frame 110 indicating the floor area is superimposed and displayed on the video image captured by the rear-facing camera 17.

Figure 7:
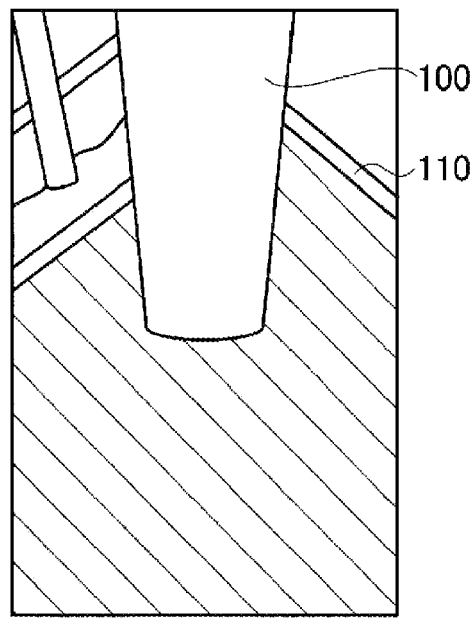
FIG. 7 is a diagram showing an example in which an avatar is arranged on the floor portion of FIG. 6.
Figure 8:
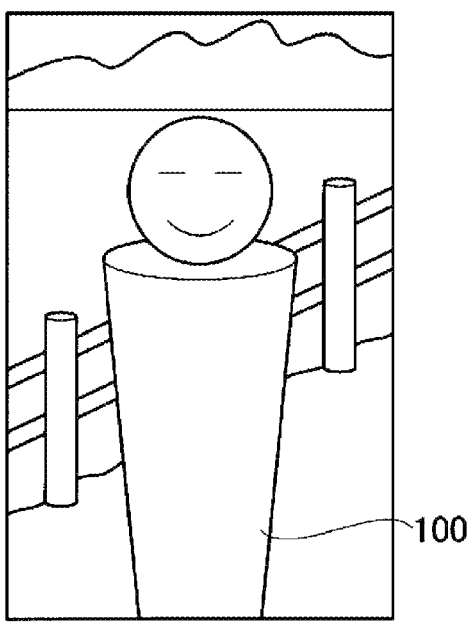
FIG. 8 is a diagram showing an example which a capturing direction is tilted upward from the state of FIG. 7.

When the distributor taps on the frame 110, the avatar controller 13 arranges the avatar 100 in the position tapped as shown in FIG. 7 (step S13). The coordinates of the tapped position in the real space coordinate system is set as the coordinate of the avatar's standing position. When another position in the frame 110 is tapped, the newly tapped position is set as the avatar's standing position. Once the coordinates of the avatar in the real space coordinate system are determined, the synthesizer 14 superimposes and displays the avatar in the live-action video captured by using the rear-facing camera 17. After that, the avatar is superimposed and displayed in the live-action video, as if the avatar actually exists in the real space. For example, when the capturing direction of the rear-facing camera 17 is tilted upward from the state illustrated in FIG. 7, the standing position of the avatar 100 remains fixed in the real space, and the upper half of the avatar 100 is displayed as illustrated in FIG. 8. Also when the capturing direction of the rear-facing camera 17 is panned leftward or rightward, the avatar 100 is superimposed and displayed in the live-action video while the standing position of the avatar 100 is fixed in the real space.

While the avatar 100 is displayed, the standing position of the avatar 100 may be adjustable by dragging the avatar 100. For example, when the distributor taps the avatar 100 and moves his/her finger leftward or rightward along the screen, while the avatar 100 is displayed as illustrated in FIG. 8, the standing position of the avatar 100 is moved leftward or rightward, respectively. When the distributor moves his/her finger upward or downward, the standing position of the avatar 100 is moved away from or closer to the distributor. When the avatar 100 is moved frontward, rearward, leftward, or rightward, the movement of the avatar 100 is stopped so as not to exceed the range recognized as the floor.

The initial arrangement unit 12 may randomly determine the standing position of the avatar when the distributor swings the video synthesis device 1. When the distributor tilts the video synthesis device 1, the initial arrangement unit 12 may determine the standing position of the avatar according to the tilt of the video synthesis device 1. For example, when the distributor tilts rightward the video synthesis device 1, the avatar 100 is moved rightward and tilting the video synthesis device 1 towards the distributor moves the avatar 100 towards the distributor.

The standing position of the avatar may be adjusted based on the image of the distributor captured by the front-facing camera 16. For example, when the distributor turns to the right, the standing position of the avatar moves rightward. When the distributor looks down, the standing position of the avatar moves towards the distributor.

When the distributor determines the position of the avatar, the initial arrangement unit 12 determines the size and the orientation of the avatar according to an operation by the distributor (step S14). For example, when the distributor flicks the touch panel upward or downward, the size of the avatar is enlarged or shrunk. The distributor flicking the touch panel leftward or rightward rotates the avatar. The distributor tapping the touch panel with two fingers resets the size and the orientation of the avatar to the initial size and the orientation.

On the floor including the avatar standing position, an object such as a tatami mattress, carpet, a stage may be arranged. In a case where a pedestal with a height is arranged as an object under the feet of the avatar, the standing position of the avatar is elevated by the height of the pedestal.

The avatar may be freely movable within a predetermined range of the floor portion, around the initial position of the avatar. For example, when the distributor is silent for a while, the avatar may be controlled so as to walk around within the predetermined range.

[Generating AR Video Image]

After the distributor finishes initial arrangement of the avatar, the video synthesis device 1 starts capturing the distributor with the front-facing camera 16 and starts generating the AR video image.

Figure 9:
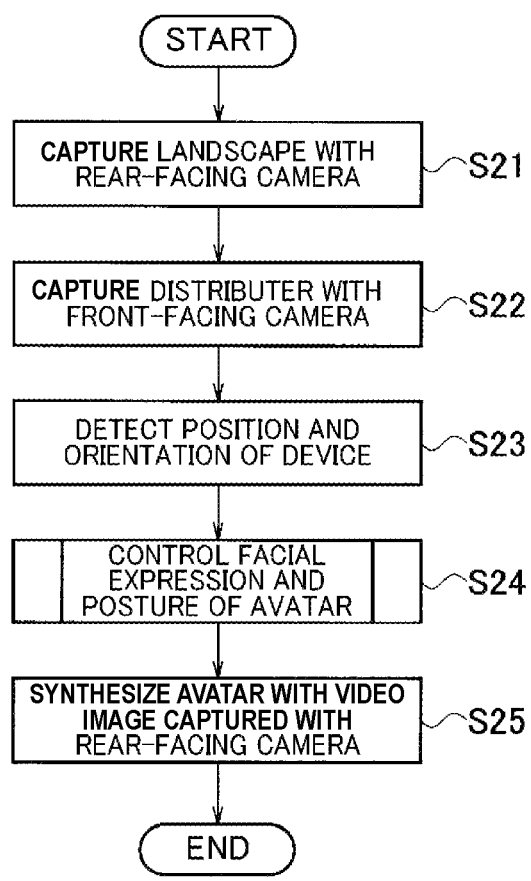
FIG. 9 is a flowchart showing a flow of an AR video image generating process.

An exemplary process of generating an AR video image is described below with reference to FIG. 9.

At the same time the rear-facing camera 17 captures the image of the landscape (step S21), the front-facing camera 16 captures the image of the distributor (step S22). The microphone collects audio to accompany the video image.

The position detector 15 detects the position and the orientation of the video synthesis device 1 (step S23).

The avatar controller 13 controls the facial expression and the posture of the avatar based on the video image of the distributor captured by the front-facing camera 16 (step S24). Processes of the avatar controller 13 will be described later.

The synthesizer 14 synthesizes the avatar with the live-action video captured by the rear-facing camera 17 to generate an AR video image (step S25).

[Avatar Control]

Figure 10:
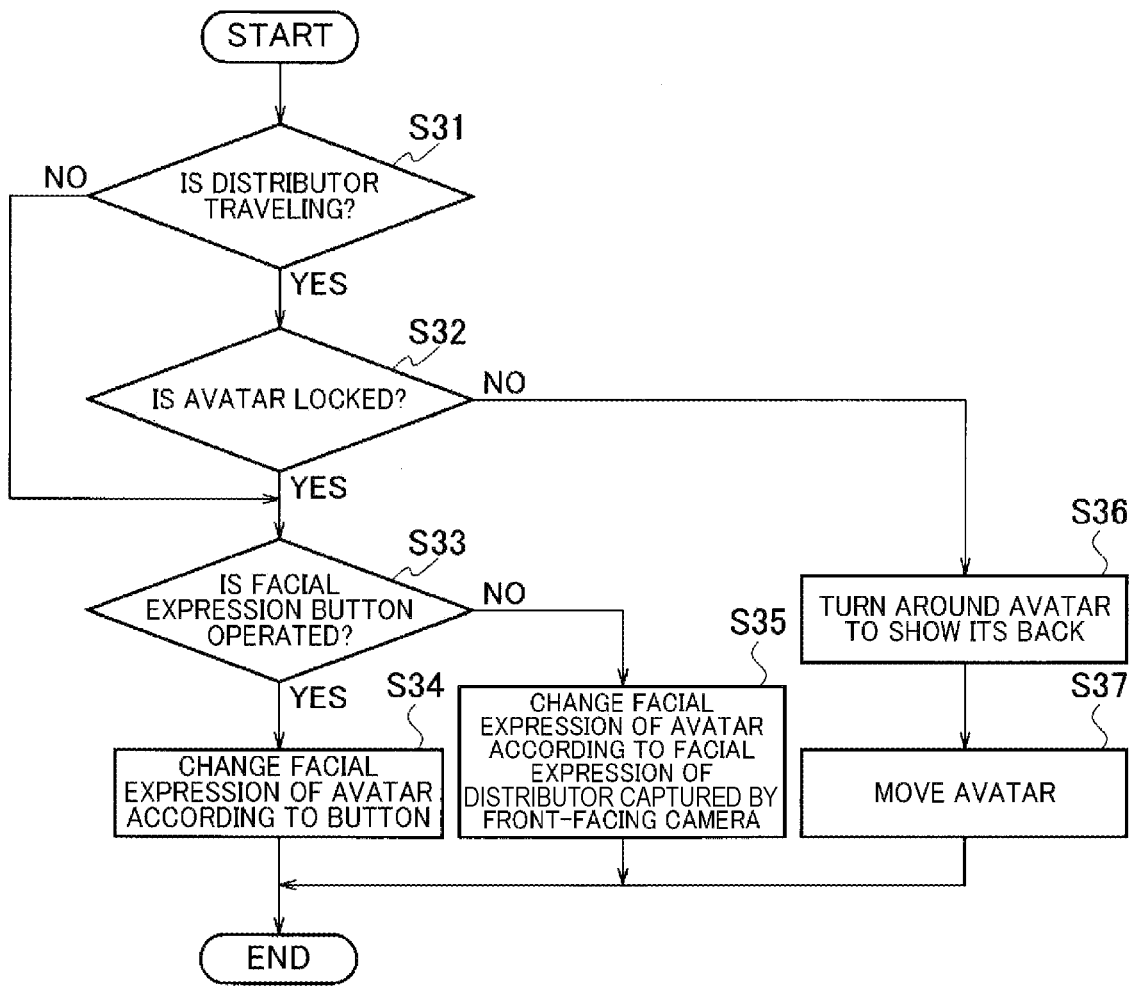
FIG. 10 is a flowchart showing a process of controlling facial expressions and postures of the avatar.

The following describes, with reference to FIG. 10, a control process of the facial expression and the posture of the avatar by the avatar controller 13.

The avatar controller 13 determines whether or not the distributor is moving (step S31). Whether or not the distributor is moving is determined based on a movement of the video synthesis device 1 detected by the position detector 15.

If the distributor is moving (Yes in step S31), whether or not the avatar position is in a locked state is determined (step S32). The avatar position being in the locked state herein means that the position of the avatar in the real space coordinate system is not movable. The standing position of the avatar is not moved even when the distributor moves. On the other hand, when the avatar position is not in the locked state, the avatar is movable according to the movement of the video synthesis device 1, while the positions of the video synthesis device 1 and the avatar in the real space coordinate system is kept at a predetermined distance from each other. When the distributor (i.e., the video synthesis device 1) moves, the avatar controller 13 moves the position of the avatar according to the movement of the distributor. The movement of the avatar is described later.

Figure 11:
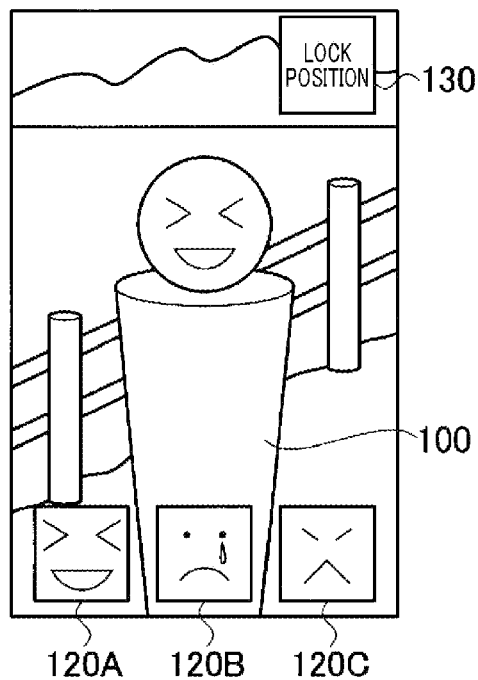
FIG. 11 is a diagram showing an example in which buttons are displayed on a touch panel.

By operating a position-lock button 130 displayed on the touch panel as shown in FIG. 11, the locked state of the avatar position is released. When the position-lock button 130 is operated while the position of the avatar is in the locked state, the locked state of the avatar position is released. If the position-lock button 130 is operated while the position of the avatar is not locked, the position of the avatar is brought into the locked state.

If the distributor is not moving (NO in step S31), or if the position of the avatar is locked (YES in step S32), the avatar controller 13 determines whether or not a facial expression button is operated (step S33). In the present embodiment, the touch panel displays facial expression buttons 120A, 120B, and 120C, as illustrated in FIG. 11. The facial expression buttons 120A, 120B, and 120C correspond to facial expressions of smiling, crying, and anger, respectively.

If any of the facial expression buttons 120A, 120B, and 120C is operated (YES in step S33), the avatar controller 13 changes the facial expression of the avatar according to which one of the facial expression buttons 120A, 120B, and 120C is operated (step S34). Emotions can be more clearly expressed by preparing animations of exaggerated facial expressions, and animating the avatar according to operation of the facial expression buttons. It is possible to cause the avatar to gesticulate in addition to changing of the facial expression on the avatar. For example, operating the facial expression button of crying causes the avatar to make a gesture of wiping tears by a hand.

The touch panel may also display a button to control the posture of the avatar (including the orientation of the avatar). For example, the touch panel may display a button to cause the avatar to turn around, a button for causing the avatar to turn its face or upper half of the body to the right or left, or the like. By operating any of these buttons, the avatar controller 13 changes the posture of the avatar according to the button operated.

The facial expression and the posture of the avatar may be controllable from a menu. For example, an edge of the touch panel is swiped to call a menu bar and an item corresponding to an intended facial expression and posture of the avatar is selected.

The avatar may be controllable by an image of a hand gesture captured by the front-facing camera 16. In this case, the avatar controller 13 associates hand gestures with control details of the avatar (facial expressions, postures, and the like), and when a specific hand gesture is detected from the video image captured by the front-facing camera 16, controls the avatar according to the detected hand gesture. For example, when the front-facing camera 16 captures an image of a gesture of making a fist, the facial expression of the avatar is changed to "angry."

Further, the avatar may be controllable by an image of text or a design captured by the front-facing camera 16. In this case, when a specific text or design is detected from the video image captured by the front-facing camera 16, the avatar controller 13 controls the avatar according to the detected text and the like. For example, text of "Smile!" is written on a piece of paper, and capturing the image of that paper by the front-facing camera 16 causes the avatar to smile.

The avatar may be controllable by a movement of the video synthesis device 1. In this case, the avatar controller 13 associates a movement of the video synthesis device 1 with a control details of the avatar, and controls the avatar according to the movement of the video synthesis device 1 detected by the position detector 15. For example, tilting the video synthesis device 1 causes the avatar to bow. However, tilting the video synthesis device 1 also tilts the landscape captured by the rear-facing camera 17. Therefore, one frame of the video image captured immediately before the detection of the tilt is used as a still background image and the bowing avatar may be synthesized with the still image. The background image may be a video image of several seconds before the detection of the tilts, instead of the still image.

The avatar controller 13 may control the avatar based on information from a sensor attached to the distributor, or control the avatar by using an external input device such as a keyboard. In this case, the video synthesis device 1 performs wireless communications with the sensor or the input device.

If no facial expression buttons are operated (YES in step S33), the avatar controller 13 tracks the face of the distributor captured by the front-facing camera 16, and reflects the facial expression of the distributor on the facial expression of the avatar (step S35). By reflecting the facial expression of the distributor captured by the front-facing camera 16 on the avatar, the avatar can be more expressively controlled without troubling the distributor.

The avatar controller 13 may cause the avatar to make a motion of speaking based on the audio of the distributor collected by a microphone.

If the distributor is moving (YES in step S31), and if the position of the avatar is not in the locked state (NO in step S32), the avatar controller 13 orients the avatar 100 to the direction in which the distributor moves (step S36), and moves the standing position of the avatar 100 in the traveling direction (step S37). Specifically, the avatar controller 13 moves the position of the avatar in such a manner that the distance between the position of the video synthesis device 1 and the standing position of the avatar in the real space coordinate system is kept at a predetermined interval. The avatar controller 13 moves the avatar away from the distributor when the distributor (video synthesis device 1) advances, moves towards the distributor when the distributor moves back, and stops the avatar when the distributor stops. It should be noted that step S33 to step S35 may be executed independently of the movement of the avatar. Specifically, step S33 may be executed after step S37 is executed.

Figure 12:
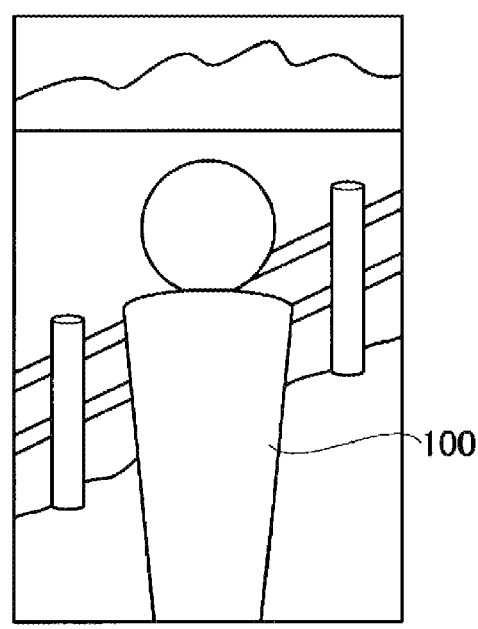
FIG. 12 is a diagram showing an example in which the avatar is turned around to show its back while the distributor is moving.

The avatar controller 13 may lock the orientation of the avatar, or orient the avatar to the traveling direction. For example, when the distributor moves forward in the state shown in FIG. 11, while the position of the avatar is unlocked and the orientation of the avatar is locked, the avatar controller 13 causes the avatar to move backward while orienting the avatar to face the video synthesis device 1. On the other hand, when the distributor moves forward in the state shown in FIG. 11, while neither the position nor the orientation of the avatar is unlocked, the avatar controller 13 orients the avatar in the traveling direction and causes the avatar to move forward, as illustrated in FIG. 12.

When the microphone collects audio of someone other than the distributor, the avatar controller 13 may orient the avatar to the source of the voice.

When the avatar is moved to an object other than the floor (e.g., a wall), the avatar controller 13 may stop the avatar at the end of the floor without further moving the avatar. When the distributor distributes an AR video image while walking, the spatial measurement unit 11 detects a flat portion in the traveling direction from the video image captured by the rear-facing camera 17, and the avatar controller 13 moves the avatar to the flat portion in the traveling direction. This way, when the distributor distributes an AR video image while walking on a road, it is possible to generate an AR video image in which the avatar appears as if it is walking on the road.

When the distributor pans the rear-facing camera 17 to the left or right while the avatar position is not in the locked state, the avatar controller 13 may move the avatar leftward or rightward, according to the capturing direction.

As described hereinabove, in the present embodiment, a rear-facing camera 17 captures a live-action video image while a front-facing camera 16 captures an image of a distributor. An avatar controller 13 controls an avatar based on an image of the distributor captured by the front-facing camera 16. A synthesizer 14 arranges the avatar in a predetermined position of a real space coordinate system and synthesizes the avatar with the live-action video image. This way, the distributor is able to generate an AR video image in which the avatar reflecting thereon a facial expression of the distributor is synthesized, while capturing a landscape before the eyes of the distributor. By tracking the face of the distributor captured by the front-facing camera 16 and reflecting the facial expression on the avatar, an expressive avatar can be synthesized.

In the present embodiment, a spatial measurement unit 11 obtains 3-dimensional spatial information of a location where the live-action video image is captured, and detects an avatar-arrangeable area which allows arrangement of the avatar. The initial arrangement unit 12 arranges the avatar in the avatar-arrangeable area and determines the position of the avatar in the real space coordinate system. This way, the avatar can be fixed in the real space without setting a marker for determining a standing position of the avatar.

In the present embodiment, the avatar controller 13 moves the position of the avatar in the real space coordinate system according to the position of the video synthesis device 1 in the real space coordinate system. Therefore, when the distributor holds the video synthesis device 1 and captures an image while walking, an AR video image in which the avatar moves along with the movement of the distributor is synthesized can be generated.

It should be noted that the present embodiment deals with a case where the video synthesis device 1 generates an AR video image. However, the video synthesis device 1 may transmit, to a server, necessary information for generating an AR video image such as live-action video image captured by the rear-facing camera 17 and the image captured by the front-facing camera 16, and the AR video image may be generated in the server or in a cloud environment.

The present disclosure relates to the subject matter described in Japanese patent application No. 2018-225022 filed on Nov. 30, 2018, the entire contents of which are herein incorporated by reference.

The invention claimed is:

1. A portable apparatus, comprising:
a first camera configured to capture an image of a subject; and
a processor configured to:
receive a live-action video of a real space different from the image of the subject;
receive a position and an orientation of second camera in a coordinate system corresponding to the live-action video, the second camera configured to capture the live-action video of the real space;
determine an area in the live-action video in which an avatar can be arranged, the avatar corresponding to the image of the subject;
synthesize the avatar in the area in the live-action video;
control the avatar responsive to a movement of the subject; and
fix a position of the avatar to the coordinate system corresponding to the live-action video when a capturing direction of the second camera is panned.

2. The portable apparatus of claim 1, wherein the processor is further configured to position the avatar in the live-action video initially responsive to an operation of the subject.

3. The portable apparatus of claim 1, wherein the processor is further configured to change the position of the avatar in the live-action video based on an operation of the subject.

4. The portable apparatus of claim 1, further comprising:
the second camera; and
a position sensor configured to detect a position and an orientation of the portable apparatus as the position and the orientation of the second camera.

5. The portable apparatus of claim 1, wherein the processor is further configured to perform measurement to obtain 3-dimensional spatial information of the live-action video, and to set the coordinate system corresponding to the live-action video.

6. The portable apparatus of claim 5, wherein the processor is further configured to obtain the 3-dimensional spatial information from a movement of a characteristic point detected based on a movement of the portable apparatus and the live-action video.

7. A video synthesis method executed by a computer, comprising:
capturing an image of a subject by a first camera;
receiving a live-action video of a real space different from the image of the subject;
receiving a position and an orientation of a second, camera in a coordinate system corresponding to the live-action video, the second camera configured to capture the live-action video of the real space;
determining an area in the live-action video in which an avatar can be arranged, the avatar corresponding to the image of the subject;
synthesizing the avatar in the area in the live-action video to generate an augmented reality video image;
controlling the avatar responsive to a movement of the subject; and
fixing a position of the avatar to the coordinate system corresponding to the live-action video when a capturing direction of the second camera is panned.

8. The video synthesis method of claim 7, further comprising positioning the avatar in the live-action video initially responsive to an operation of the subject.

9. The video synthesis method of claim 7, further comprising changing the position of the avatar in the live-action video based on an operation of the subject.

10. The video synthesis method of claim 7, further comprising detecting a position and an orientation of a device comprising the computer as the position and the orientation of the second camera.

11. The video synthesis method of claim 7, further comprising:
performing measurement to obtain 3-dimensional spatial information of the live-action video; and
setting the coordinate system corresponding to the live-action video.

12. The video synthesis method of claim 11, further comprising:
detecting a movement of a characteristic point based on a movement of a device comprising the computer and the live-action video; and
obtaining the 3-dimensional spatial information from the movement of the characteristic point detected.

13. The video synthesis method of claim 11, further comprising:
detecting a flat portion in the 3-dimensional spatial information of the live-action video as the area in the live-action video in which the avatar can be arranged.

14. A non-transitory computer-readable recording medium storing a program that, when executed, causes a processor to execute functions comprising:
capturing an image of a subject by a first camera;
receiving a live-action video of a real space different from the image of the subject;
receiving a position and an orientation of a second camera in a coordinate system corresponding to the live-action video, the second camera configured to capture the live-action video;
determining an area in the live-action video in which an avatar can be arranged, the avatar corresponding to the image of the subject;
synthesizing the avatar in the area in the live-action video to generate an augmented reality video image;
controlling the avatar responsive to a movement of the subject; and
fixing a position of the avatar to the coordinate system corresponding to the live-action video when a capturing direction of the second camera is panned.

15. The non-transitory computer-readable recording medium of claim 14, wherein the functions further comprise positioning the avatar in the live-action video initially responsive to an operation of the subject.

16. The non-transitory computer-readable recording medium of claim 14, wherein the functions further comprise changing the position of the avatar in the live-action video based on an operation of the subject.

17. The non-transitory computer-readable recording medium of claim 14, wherein the functions further comprise detecting a position and an orientation of a device comprising the processor as the position and the orientation of the second camera.

18. The non-transitory computer-readable recording medium of claim 14, wherein the functions further comprise:
performing measurement to obtain 3-dimensional spatial information of the live-action video; and
setting the coordinate system corresponding to the live-action video.

19. The non-transitory computer-readable recording medium of claim 18, wherein the functions further comprise:
detecting a movement of a characteristic point based on a movement of a device comprising the computer and the live-action video; and
obtaining the 3-dimensional spatial information from the movement of the characteristic point detected.

20. The non-transitory computer-readable recording medium of claim 18, wherein the functions further comprise:
detecting a flat portion in the 3-dimensional spatial information of the live-action video as the area in the live-action video in which the avatar can be arranged.

* * * * *